Oct. 17, 1967 H. SCHLÜTER ETAL 3,347,995
MAKE BEFORE BREAK BALL TYPE ARMATURE
REED RELAY SWITCHING NETWORK
Filed July 22, 1964 3 Sheets-Sheet 1

INVENTORS
H. SCHLÜTER - H. SCHÖNEMEYER
BY [signature]
ATTORNEY

Oct. 17, 1967 H. SCHLÜTER ETAL 3,347,995

MAKE BEFORE BREAK BALL TYPE ARMATURE REED RELAY SWITCHING NETWORK

Filed July 22, 1964 3 Sheets-Sheet 2

INVENTORS
H. SCHLÜTER · H. SCHÖNEMEYER

BY [signature]
ATTORNEY

Oct. 17, 1967 H. SCHLÜTER ET AL 3,347,995

MAKE BEFORE BREAK BALL TYPE ARMATURE
REED RELAY SWITCHING NETWORK

Filed July 22, 1964 3 Sheets-Sheet 3

INVENTORS
H. SCHLÜTER - H. SCHÖNEMEYER

BY [signature]

ATTORNEY

United States Patent Office 3,347,995

Patented Oct. 17, 1967

3,347,995

MAKE BEFORE BREAK BALL TYPE ARMATURE REED RELAY SWITCHING NETWORK

Heinz Schlüter, Kornwestheim, Wurttemberg, and Hilmar Schönemeyer, Ditzingen, Wurttemberg, Germany, assignors to International Standard Electric Corporation, New York, N.Y., a corporation of Delaware Filed July 22, 1964, Ser. No. 384,354
Claims priority, application Germany, Aug. 3, 1963, St 20,945
2 Claims. (Cl. 179—18)

ABSTRACT OF THE DISCLOSURE

A switching network comprising matrices of reed relay crosspoints. The reed relays have definite break before make contacts characteristics such as those supplied with certain ball type armature reed relays.

This invention relates to cross-point switching arrangements and more particularly to networks of cascaded reed switching matrices.

Reed switches are contacts sealed in a glass capsule or tube and operated by nearby coils. Their characteristics are such that they may be used in conjunction with electronic controls. Thus they are extremely useful in electronic switching.

One recently developed reed switch uses a ball as an armature. By properly controlled energization of an associated coil, the ball may be made to roll from one end to the other of the glass tube. This way, it may bridge contacts at either end to make or break electrical circuits. By a correct proportioning of the contacts, the switch may be made to make or break in any desired sequence.

Accordingly, an object of the invention is to provide new and improved glass reed switching arrangements, and more particularly to provide matrices for telephone switching networks.

Another object of the invention is to reduce the interstage controls.

The above mentioned and other features of this invention and the manner of obtaining them will become more apparent, and the invention itself will be best understood by reference to the following description of an embodiment of the invention taken in conjunction with the accompanying drawings, in which.

Figure 1:
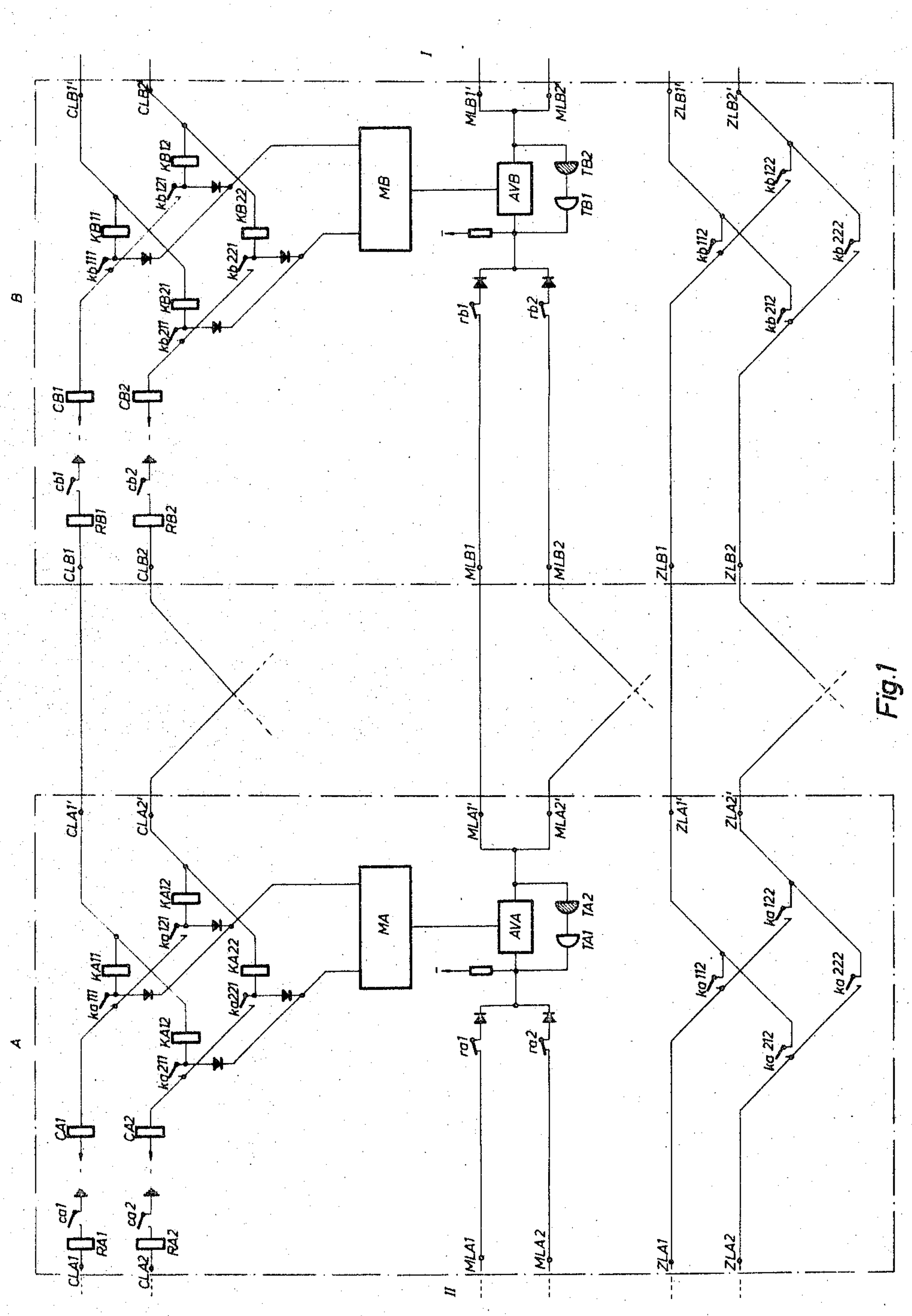
FIG. 1 is a schematic circuit diagram showing the prior art network which the invention improves.

In telecommunication, particularly telephone systems with cross-point arrangements in addition to the speech and signalling wires, further wires are required in order to control the establishment of a connection. FIG. 1 demonstrates a system known. In said figure only such details are shown necessary to understand the system. Marking of available lines and through-connection of the lines is made in the direction opposite to the conventional arrangements, i.e. from cross-point stage B to cross-point stage A. Selection of an available line is made in the direction from cross-point stage A to cross-point stage B. FIG. 1 shows the cross-point multiples A and B of two successive cross-point stages. On the drawing only the *c*-wires (seizing wires), Z-wires (counting wires), and *m*-wires (route selecting wires) are shown. In normal unoperated position a continuous negative potential is applied to all *m*-wires of the route selecting network, represented only through the points MLB1' and MLB2'. Due to this offering signal the transistor TB2 in the cross-point multiple B is conductive and the transistor TB1 cut off. Consequently, the offering signal or potential is also applied to the *m*-wires of the preceding stage. Therefore the transistor TA2 is conductive in the cross-point multiple A, the transistor TA1 is cut off and the offering signal is forwarded in the same way.

When a connection shall be established ground potential is applied to one, several, or all *m*-wires in the selecting direction as an access signal. The drawing only shows the wires MLA1 and MLA2. The access signal is forwarded to all outgoing *m*-wires via the offering amplifier AVA. On the drawing only the wires MLA1' and MLA2' are shown. The access signal passes through the cross-point multiple B and the following cross-point multiples in the same way. The necessary selection of only one cross-point multiple within a cross-point stage, prior to advancing of the access signal, is without interest for this application and therefore not described in detail.

After the access signal has passed through all cross-point stages, ground potential is applied to a *c*-wire in order to set the connecting path in the direction of the marking. For example the wire CLB1' is used. The marker MB in the cross-point multiple B has marked for example the right column. Thereby the cross-point relay KB11 is energized and closes through its contact *kb*111 its holding circuit and the responding circuit for the relay CB1. Through its other contacts it through-connects the other wires, e.g. the *z*-wire by the contact *kb*112.

When relay CB1 has operated, contact *cb*1 closes and applies ground potential to the *c*-wire CBL1–CLA1'. When a column in the cross-point multiple A has been marked through the marker MA the corresponding cross-point relay is energized and, in series, also the relay RB1 in the cross-point multiple B. The relay RB1 disconnects through its contact *rb*1 the *m*-wire MLB1–MLA1' and thus provides the seizing characteristic in the searching network. The connection is through-connected in the cross-point multiple A and in any other cross-point multiples in the same way.

From the description may be gathered that in the unoperated condition and during the establishment of a connection, the counting wire Z and the speech wires are not necessary. Whereas, in the operated condition, i.e. when both parties or subscribers are talking, the marking wire M is disconnected.

The object of the invention is to provide an arrangement which reduces the number of wires that are extended through a cross-point. According to the invention, the wires of the link lines (or of the terminating or outgoing lines) are connected through contacts of the cross-point elements. These lines may either be extended to the facilities required to establish the connection or be connected with each other for establishing the call condition. According to a further embodiment of the invention the break contacts and the make contacts of the cross-point elements are designed as sequence-break-make-contacts. This embodiment gives another advantage because the lines in the selecting network are already marked as busy before the cross-point is definitely through-connected. The possibility of a double seizing is thereby avoided to a far-reaching extent.

Figure 2:
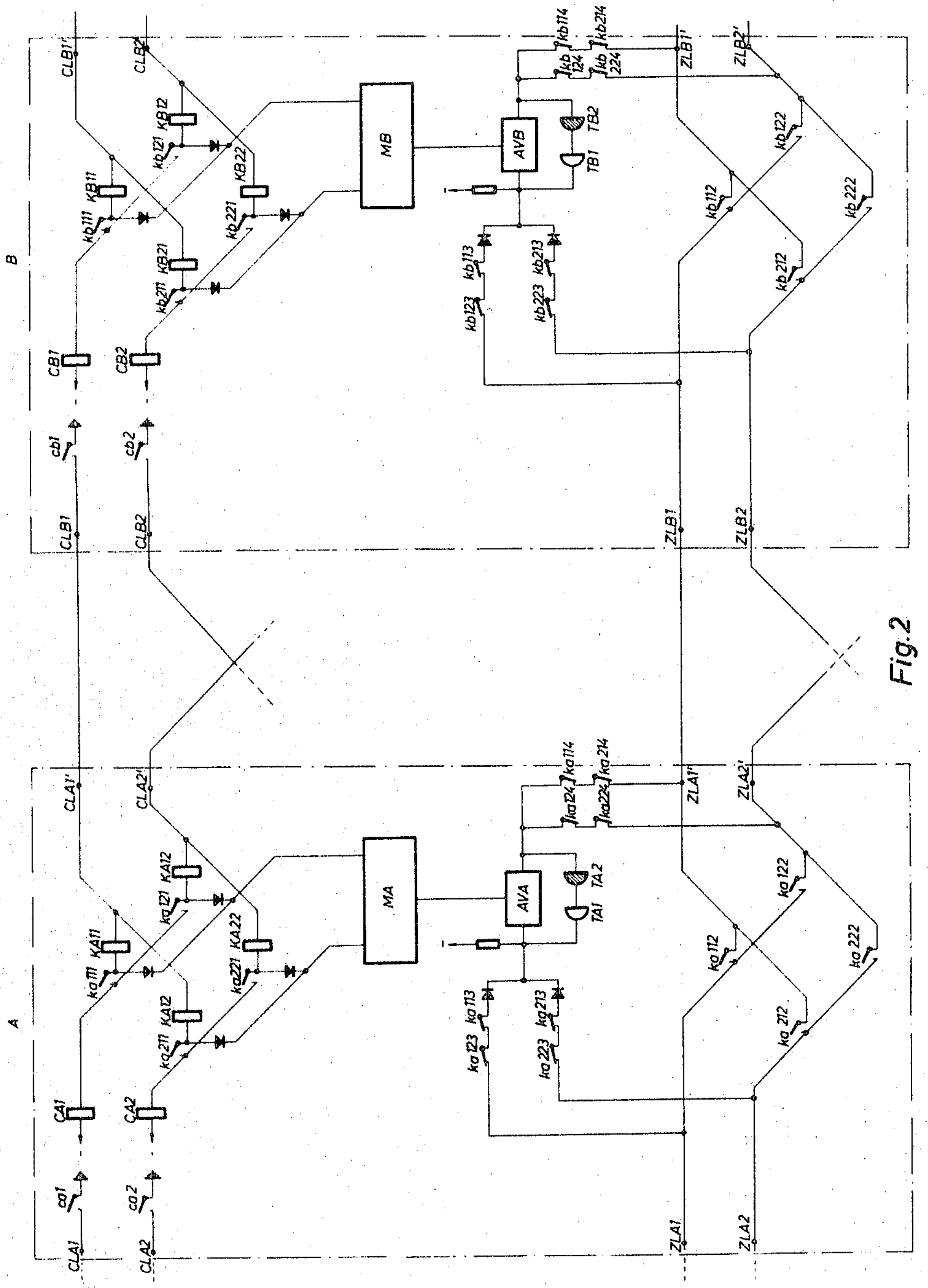
FIG. 2 is a schematic circuit diagram showing the improved network having fewer interstage wires.

The invention is now explained in detail with the aid of an example and the accompanying FIG. 2.

The transmission of digital signals and the setting of a switch path is achieved in the same way as in the prior art arrangement shown in FIG. 1.

Figure 3:
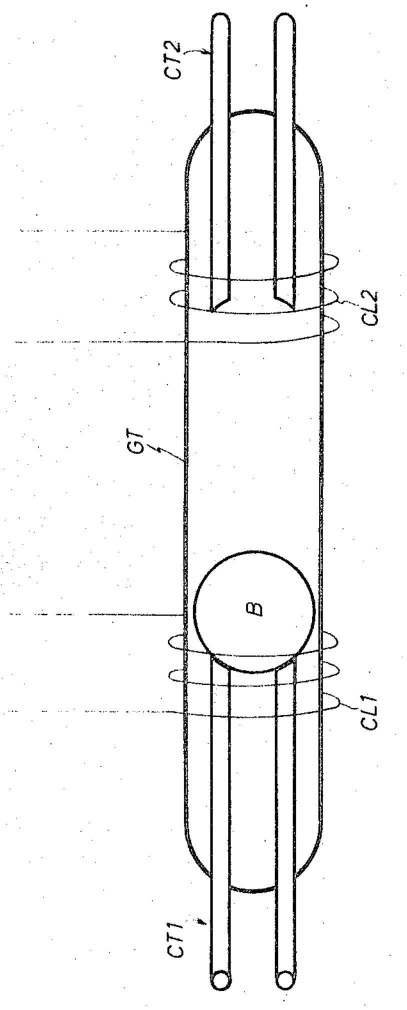
FIG. 3 is a showing of a ball armature type reed switch cross-point.

In our example (FIG. 2), reed contacts with ball-type armatures are used as cross-point contacts. The contacts operate in a sequence of break-before-make in the reed switches. For example, contact *kb*113 opens before contact *kb*111 closes. In greater detail, the cross-point reed switch may be made as shown in FIG. 3 where a glass tube GT has contacts CT1 sealed in one end and contacts CT2 sealed in the other end. A ball B is adapted to roll between these two sets of contacts under the influence of magnetic fields set up by the selective energization of coils CL1, CL2. As can be seen from the drawing, the contacts CT1 are broken before the contacts CT2 are made.

In the non-operated condition, negative potential is applied to all Z-wires as an offering signal. In the drawing only the wires ZLB1′ and ZLB2′ are shown; however, the network will contain many similar wires. The holding signal now reaches the conductive transistor TB2 via the series connection of the break contact *kb*114 and *kb*214 or *kb*124 and *kb*224 respectively. This cuts off the transistor TB1. Through break-contacts *kb*113 and *kb*123 or *kb*213 and *kb*223, respectively, the offering signal is also applied to the lines ZLB1 and ZLB2. In the same way the offering signal is through-connected through the cross-point multiple A.

To establish a connection the access signal is now applied in the opposite direction, as described above, to initiate the corresponding switching process. Ground potential is applied to a *c*-wire to set the cross-points. The relay KB11 can operate in the column marked by the marker MB. When this relay is energized, the contacts *kb*113 and *kb*114 first break and separate the Z-wires from the amplifier AVB and from the transistors TB2 and TB1. The amplifier AVB is used for the route searching and the marking. Only after these contacts *kb*113, *kb*114 are open can the contacts *kb*111 and *kb*112 close. while contact *kb*112 through-connects the *z*-wire, contact *kb*111 through-connects the holding circuit in which the relay CB1 also. This advances the ground potential for setting the cross-point in the next following cross-point stage. The cross-point stage A is set in exactly the same way as the cross-point stage B.

By using other reed contacts with ball-type armatures, the speech wires can also be used for establishing a connection. It is then possible, for example, to use separate paths for the offering signal and for the access signal in order to simplify the facilities in the individual cross-point stages.

While the principles of the invention have been described above in connection with specific apparatus and applications, it is to be understood that this description is made only by way of example and not as a limitation on the scope of the invention.

We claim:

1. A switching network comprising a plurality of cascaded switching stages joined by interstage wirings including control wires and speech wires, reed switches at each cross-point in said network for switching said wires, marker means in each stage for providing marking signals to select the desired reed relay cross-point under the control of signals received over said speech wires, and means comprising ball armature contacts in the reed switches for selectively connecting individual ones of said speech wires either to said marker means in the switching stage or through said network thereby reusing said wires to perform different functions at different times during the establishment and control of a switch path.

2. The network of claim 1 and means for coupling said speech wires to normally open contacts used for extending said wires through a switching stage and to normally closed contacts used for extending said wires to said marker means, said normally open contacts and normally closed contacts located at opposite ends of each of said reed switches, said speech wires are connected to said marker means when said cross-points are not operated and in a break before make sequence through said stage when said cross-points are operated.

References Cited

UNITED STATES PATENTS

| | | | |
|---|---|---|---|
| 2,980,776 | 4/1961 | Ovshinsky | 335—154 |
| 3,110,772 | 11/1963 | Hayward | 179—22 |
| 3,188,423 | 1/1965 | Glenner et al. | 179—18.7 |
| 3,261,942 | 7/1966 | Wessel | 335—154 |
| 3,271,523 | 9/1966 | Karrer | 179—22 |
| 3,301,964 | 1/1967 | Erwin | 179—25 |

KATHLEEN H. CLAFFY, *Primary Examiner.*

L. A. WRIGHT, *Assistant Examiner.*